(12) United States Patent
Amisano et al.

(10) Patent No.: US 8,103,420 B2
(45) Date of Patent: Jan. 24, 2012

(54) METHOD AND SYSTEM FOR CONTROLLING A VEHICLE PROVIDED WITH A SERVO MECHANICAL GEAR-CHANGE

(75) Inventors: Fabrizio Amisano, Turin (IT); Cesare Sola, Valperga (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 879 days.

(21) Appl. No.: 12/153,621

(22) Filed: May 21, 2008

(65) Prior Publication Data

US 2008/0294320 A1    Nov. 27, 2008

(30) Foreign Application Priority Data

May 21, 2007 (EP) .................................. 07425300

(51) Int. Cl.
*B60T 7/12* (2006.01)
(52) U.S. Cl. ......................................................... 701/70
(58) Field of Classification Search ................ 701/70
See application file for complete search history.

(56) References Cited

U.S. PATENT DOCUMENTS

| | | | |
|---|---|---|---|
| 6,260,934 B1 * | 7/2001 | Lee | 303/192 |
| 6,439,675 B1 * | 8/2002 | Zechmann et al. | 303/191 |
| 6,679,810 B1 * | 1/2004 | Boll et al. | 477/195 |
| 7,226,389 B2 * | 6/2007 | Steen et al. | 477/195 |
| 2006/0106520 A1 * | 5/2006 | Bodin et al. | 701/67 |

FOREIGN PATENT DOCUMENTS

| | | |
|---|---|---|
| DE | 19949203 | 4/2000 |
| DE | 19950034 | 4/2001 |
| DE | 10311445 | 9/2004 |
| WO | WO 2004/028876 | 4/2004 |

OTHER PUBLICATIONS

European Search Report mailed Oct. 31, 2007 in European Appln. No. 07425300.6.

* cited by examiner

*Primary Examiner* — Joanne Silbermann
*Assistant Examiner* — Michael Stabley
(74) *Attorney, Agent, or Firm* — Davidson Berquist Jackson & Gowdey, LLP

(57) ABSTRACT

A method and system for controlling a vehicle, according to which it is determined whether the vehicle is on a slope; it is detected whether the internal-combustion engine is turned on; it is detected whether the vehicle is stationary; a parking brake is activated automatically and independently of the action of the driver, by driving a respective servo control if the vehicle is on a slope, if the internal-combustion engine is turned on and if the vehicle is stationary; and the parking brake is disengaged automatically and independently of the action of the driver, by driving the corresponding servo control when the clutch is disengaged by a corresponding servo control for transmitting the torque generated by an internal-combustion engine of the vehicle to the driving wheels.

7 Claims, 2 Drawing Sheets

METHOD AND SYSTEM FOR CONTROLLING A VEHICLE PROVIDED WITH A SERVO MECHANICAL GEAR-CHANGE

TECHNICAL FIELD

The present invention relates to a method and to a system for controlling a vehicle provided with a servo mechanical gear-change.

BACKGROUND ART

There is an increasing diffusion of servo gear-changes that are structurally similar to a manual gear-change of a traditional type except for the fact that the clutch pedal and the gear lever actuated by the driver are replaced by corresponding electrical or hydraulic servo controls.

Using a servo gear-change, the driver must simply send (for example, using two levers set on the opposite sides of the steering column), to a control unit for controlling the transmission for passing to a higher gear or else to a lower gear, and the control unit of the transmission autonomously carries out the gear change by acting both on the engine and on the servo controls associated to clutch and the gear-change.

The use of a servo gear-change is extremely simple and intuitive in almost all driving situations; however, also using a servo gear-change execution of a start on an uphill slope (i.e., starting the vehicle when it is standing still on an uphill slope) can prove problematical for a beginner, particularly when it is not possible to allow any movement backwards of the vehicle (for example, when another vehicle is in a queue immediately behind him).

DISCLOSURE OF INVENTION

The aim of the present invention is to provide a method and a system for controlling a vehicle provided with a servo mechanical gear-change, said control method and system being free from the drawbacks described above and, in particular, being easy and inexpensive to implement.

Provided according to the present invention are a method and a system for controlling a vehicle provided with a servo mechanical gear-change as claimed in the attached Claims.

BRIEF DESCRIPTION OF THE DRAWINGS

The present invention will now be described with reference to the annexed plate of drawings, which illustrate a non-limiting example of embodiment thereof, and in which.

PREFERRED EMBODIMENTS OF THE INVENTION

Figure 1:
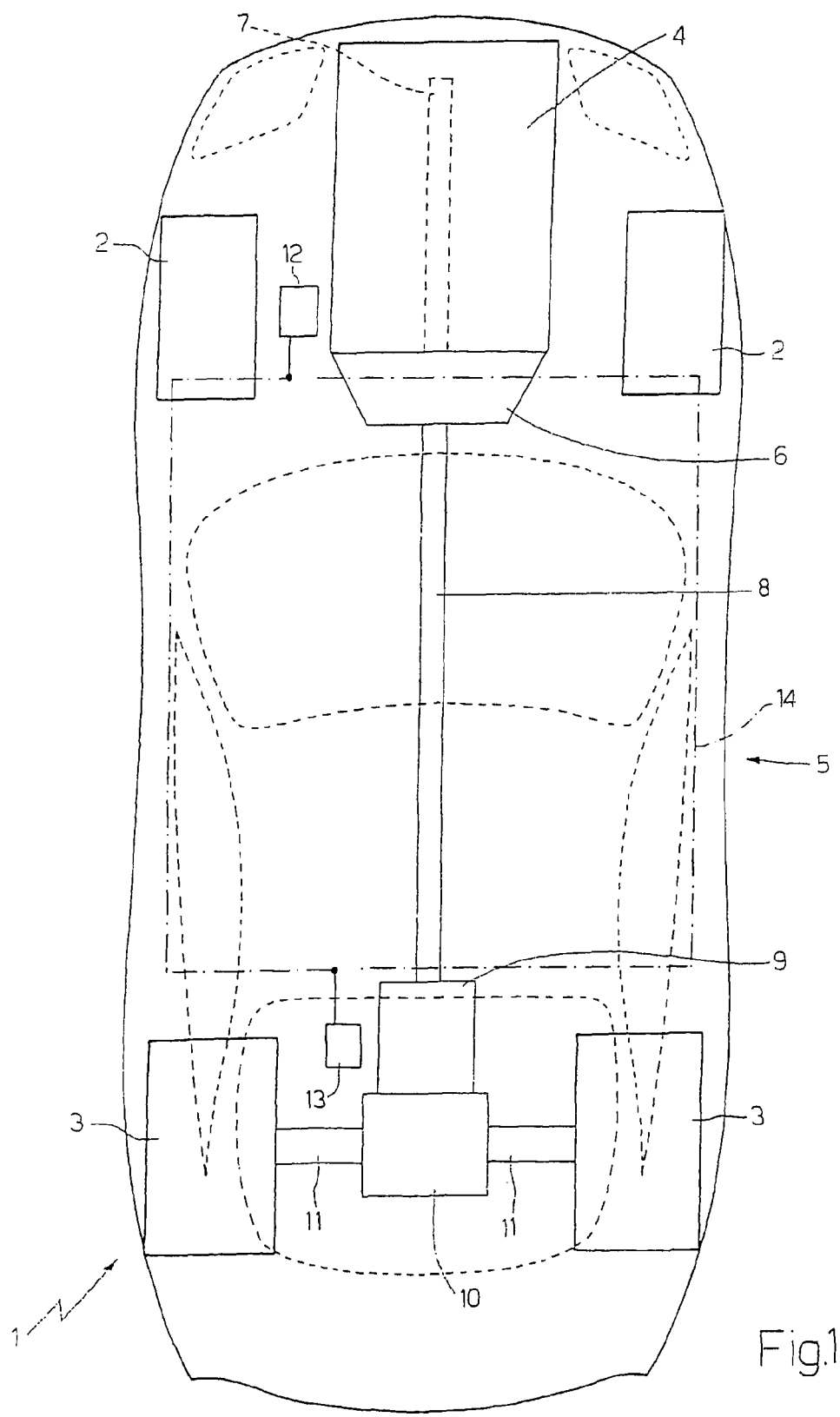
FIG. 1 is a schematic plan view of a rear-drive vehicle provided with a control system built according to the present invention.

In FIG. 1, the number 1 designates as a whole a motor vehicle provided with two front wheels 2 and two rear driving wheels 3 that receive the torque generated by an internal-combustion engine 4 by means of a servo transmission 5. The servo transmission 5 comprises a servo clutch 6, which is housed in a bell fixed with respect to the engine 4 and is designed to connect a drive shaft 7 of the engine 4 to a transmission shaft 8 terminating in a servo gear-change 9 set on the rear axle. Cascaded to the servo gear-change 9 is a self-locking differential 10, from which there depart a pair of axleshafts 11, each of which is fixed with respect to a respective rear driving wheel 3.

The motor vehicle 1 comprises a control unit 12 (illustrated schematically) of the engine, a control unit 13 (illustrated schematically) of the transmission, and a line 14 BUS, which is built according to the CAN (Car Area Network) protocol and is extended to the entire motor vehicle 1. Both the control unit 12 for controlling the engine and the control unit 13 for controlling the transmission are connected to the line 14 BUS and can thus communicate with one another by means of messages forwarded on the line 14 BUS itself.

Figure 2:
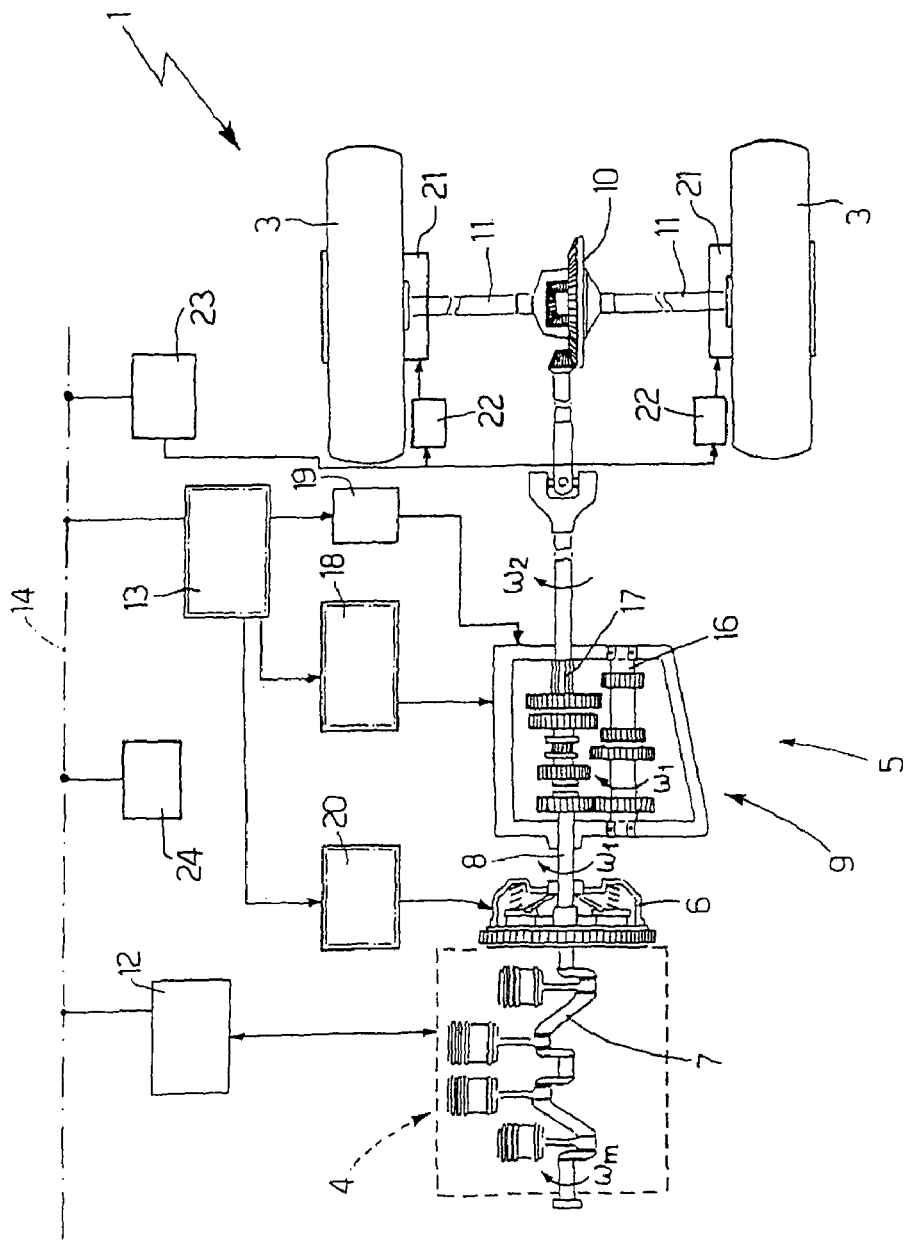
FIG. 2 is a schematic view of the system for controlling FIG. 1.

According to what is illustrated in FIG. 2, the servo gear-change 9 comprises a primary shaft 16, which turns at an angular velocity $\omega_1$, and a secondary shaft 17, which turns at an angular velocity $\omega_2$ and transmits motion to the rear driving wheels 3 by means of the differential 10 and the pair of axleshafts 11. The servo gear-change 9 is actuated by a servo control 18 for activating/deactivating a gear and by a servo control 19 for selecting a gear; the servo control 18 and the servo control 19 can be of an electrical type or of a hydraulic type and are driven by the control unit 13 for controlling the transmission 5.

By means of interposition of the servo clutch 6, the primary shaft 16 is connected to the drive shaft 7, which is driven in rotation by the engine 4 and turns at an angular velocity $\omega_m$. The servo clutch 6 is actuated by a servo control 20, which is preferably of a hydraulic type and is driven by the control unit 13 for controlling the transmission 5.

In the case of manual control of the servo transmission 5, the driver of the motor vehicle 1 sends, in a known way, the request for making a gear change to the control unit 13 for controlling the transmission. During a gear change from a current gear to a next gear, the control unit 13 sends a command for the execution in sequence of a series of operations, each of which must be carried through before being able to carry through the next operation. In particular, the series of operations to be performed for making a gear change from a current gear to a next gear comprises:

cutting off the torque delivered by the engine 4 to prevent a sharp and uncontrolled increase in the angular velocity $\omega_m$ of the drive shaft 7;

engaging the servo clutch 6 by driving the servo control 20;

disengaging the current gear by driving the servo control 18;

selecting the next gear by driving the servo control 19;

engaging the next gear by driving the servo control 18;

disengaging the servo clutch 6 by driving the servo control 20; and restoring the torque delivered by the engine 4.

In the case of starting from a standstill, i.e., starting from a condition in which the servo gear-change 9 is in "neutral", the servo clutch 6 is typically engaged, and the engine 4 is idling, some operations described above are no longer necessary, and in particular it is no longer necessary to cut off the torque delivered by the engine 4, engage the servo clutch 6 and disengage the current gear.

The servo controls 18, 19 and 20 are driven directly by the control unit 13 for controlling the transmission; instead, the variations of the torque delivered by the engine 4 are made by the control unit 12 for controlling the engine 4 following upon a specific request for the control unit 13 for controlling the transmission 5 forwarded by means of the line 14 BUS.

According to what is illustrated in FIG. 2, the motor vehicle 1 also comprises a servo parking brake 21, which acts on the rear wheels 3 and is actuated by a servo control 22 of an electrical or hydraulic type that is driven by a control unit 23 for controlling the parking brake (illustrated schematically), which is also connected to the line 14 BUS for dialoguing with the control unit 13 for controlling the transmission.

During the operation of the motor vehicle 1 (i.e., when the ignition key of the motor vehicle is inserted), the control unit 23 for controlling the parking brake determines whether the motor vehicle 1 is on a slope for example, using the measurement supplied by a sensor 24 of longitudinal inclination connected to the line 14 BUS (said sensor is normally present in a modern motor vehicle in so far as it is necessary to the device for controlling the stability). Furthermore, during operation of the motor vehicle 1, the control unit 23 for controlling the parking brake detects whether the internal-combustion engine 4 is turned on (information that is supplied by the control unit 12 for controlling the engine) and detects whether the motor vehicle 1 is stationary, i.e., whether the angular velocity of the motor vehicle 1 is zero (information that is supplied by a speedometer connected to the line 14 BUS and present in all motor vehicles).

Combining the information listed above, the control unit 23 for controlling the parking brake activates, automatically and independently of the action of the driver, the parking brake 21 by driving the servo control 22 if the motor vehicle 1 is on a slope, if the internal-combustion engine 4 is turned on, and if the motor vehicle 1 is stationary; in other words, if the motor vehicle 1 is stationary with the engine 4 turned on (hence the servo clutch 6 is necessarily engaged and/or the servo gear-change 9 is in "neutral") and is on a slope, the parking brake 21 is activated automatically to keep the motor vehicle 1 braked and thus prevent any movement of the motor vehicle 1 caused by the slope.

Furthermore, the control unit 13 for controlling the transmission communicates to the control unit 23 for controlling the parking brake when the servo clutch 6 is disengaged for transmitting the torque generated by the internal-combustion engine 4 to the rear driving wheels 3. In this way, the control unit 23 for controlling the parking brake deactivates, automatically and independently of the action of the driver, the parking brake 21 by driving the servo control 22 when the clutch 6 is disengaged for transmitting the torque generated by the internal-combustion engine 4 to the driving wheels 3.

According to a preferred embodiment, when the slope is favourable (i.e., the motor vehicle 1 is facing downhill and has to move forwards or the motor vehicle 1 is facing uphill and has to move backwards) the instant in which automatic disengagement of the parking brake 21 occurs is anticipated with respect to when the slope is unfavourable (i.e., the motor vehicle 1 is facing uphill and has to move forwards or the motor vehicle 1 is facing downhill and has to move backwards). Said choice is linked to the fact that when the slope is favourable the action of the slope pushes the motor vehicle 1 in the desired direction and hence it is not necessary to counter the action of the slope when the driver has decided to move the motor vehicle 1; instead, when the slope is unfavourable the action of the slope pushes the motor vehicle 1 in the direction opposite to the desired direction, and hence it is necessary to counter the action of the slope until the servo transmission 5 starts to move the motor vehicle 1 in the desired direction.

According to a possible embodiment, if the slope is favourable the parking brake 21 is disengaged when the command for engagement of the gear is generated; alternatively, if the slope is favourable the parking brake 21 is disengaged when the command for disengagement of the servo clutch 6 is generated.

According to a preferred embodiment, if the slope is unfavourable, the parking brake 21 is disengaged only when the servo clutch 6 starts effectively to transmit torque to the rear driving wheels 3. In this case, the disengagement of the parking brake 21 envisages storing previously a position of engagement of the servo clutch 6 in which the servo clutch 6 starts to transmit torque, disengaging the servo clutch 6 by driving the servo control 20, detecting cyclically the position of the servo clutch 6, and deactivating, automatically and independently of the action of the driver, the parking brake 21 by driving the servo control 22 when the clutch 6 is in the neighbourhood of the position of engagement. The position of the servo clutch 6 is cyclically detected by a position sensor (not illustrated), mechanically coupled to the servo clutch 6 and connected to the control unit 13 for controlling the transmission. It should be emphasized that the parking brake 21 can be disengaged when the clutch 6 is a little before the position of engagement or else a little after the position of engagement according to the delays of reading and of response of the various components of the system.

According to a possible embodiment, the control unit 23 for controlling the parking brake could estimate the gradient and could hence anticipate or delay the instant in which automatic disengagement of the parking brake 21 occurs according to the gradient. In other words, in the case of a particularly accentuated unfavourable slope, the torque transmitted to the rear driving wheels 3 must overcome a high gravitational thrust and hence must be greater to prevent any appreciable movement of the motor vehicle 1 in a direction opposite to the desired direction; hence, in the case of a particularly accentuated unfavourable slope, the instant in which automatic disengagement of the parking brake 21 occurs is delayed in such a way that the parking brake 21 is disengaged when the servo clutch 6 transmits a relatively high torque.

The system described above for controlling the motor vehicle 1 (implemented basically in the control units 13 and 23) presents numerous advantages in so far as it is simple and inexpensive to implement in a vehicle provided with a servo transmission and a servo parking brake and above all renders starting of the vehicle even extremely simple and intuitive when the vehicle is on a slope.

In particular, in the case of starting on an uphill slope the motor vehicle 1 is automatically braked by the parking brake 21 up to the instant in which the clutch 6 transmits torque to the rear driving wheels 3, thus preventing the motor vehicle 1 from possibly moving backwards (i.e., in the direction opposite to the one desired by the driver). Furthermore, the engagement and the disengagement of the parking brake 21 are completely automatic and do not require any intervention by the driver, who must simply press on the accelerator pedal for starting the motor vehicle 1.

The invention claimed is:

1. A method for controlling a vehicle (1), said vehicle (1) comprising:
    an internal-combustion engine (4) provided with an engine shaft (7);
    a servo mechanical gear-change (9), actuated by at least one first servo control (18, 19);
    a servo clutch (6), actuated by at least one second servo control (20) and set between the engine shaft (7) and a primary shaft (16) of the gear-change (9) for connecting and disconnecting the engine shaft (7) to/from the primary shaft (16) of the gear-change (9); and
    a servo parking brake (21), actuated by at least one third servo control (22);
    the control method comprises the steps of:

determining whether the vehicle (1) is on a slope;

detecting whether the internal-combustion engine (4) is turned on; and detecting whether the vehicle (1) is stationary;

activating the parking brake (21) automatically and independently of the action of the driver, by driving the third servo control (22) if the vehicle (1) is on a slope, if the internal-combustion engine (4) is turned on, and if the vehicle (1) is stationary; and deactivating the parking brake (21) automatically and independently of the action of the driver, by driving the third servo control (22) when the clutch (6) is disengaged for transmitting the torque generated by the internal-combustion engine (4) to the driving wheels (3);

wherein, when the slope is favorable, the instant in which automatic disengagement of the parking brake occurs is anticipated with respect to when the slope is unfavorable.

2. The control method according to claim 1, wherein, if the slope is favorable the parking brake (21) is disengaged when the command for engagement of the gear is generated.

3. The control method according to claim 1, wherein, if the slope is favorable the parking brake (21) is disengaged when the command for disengagement of the clutch (6) is generated.

4. The control method according to claim 1 wherein, if the slope is unfavorable the parking brake (21) is disengaged only when the clutch (6) starts effectively to transmit torque.

5. The control method according to claim 4, wherein the step of deactivating the parking brake (21) comprising the further steps of:

storing a position of engagement of the clutch (6) in which the clutch (6) starts to transmit torque;

disengaging the clutch (6), by driving the second servo control (20);

detecting cyclically the position of the clutch (6); and deactivating the parking brake (21) automatically and independently of the action of the driver, by driving the third servo control (22) when the clutch (6) is in the neighbourhood of the position of engagement.

6. The control method according to claim 1 and comprising the further steps of:

estimating the gradient;

anticipating or delaying the instant in which automatic disengagement of the parking brake (21) according to the gradient occurs.

7. A method for controlling a vehicle having an internal-combustion engine provided with an engine shaft, a servo mechanical gear-change, actuated by a first servo control; a servo clutch, actuated by a second servo control and set between the engine shaft and a primary shaft of the gear-change for connecting and disconnecting the engine shaft to/from the primary shaft of the gear-change; and a servo parking brake, actuated by a third servo control;

the control method comprising the steps of:

determining whether the vehicle is on a slope;

detecting whether the internal-combustion engine is turned on;

detecting whether the vehicle is stationary;

activating the servo parking brake automatically and independently of the action of the driver, by driving the third servo control if the vehicle is on a slope, if the internal-combustion engine is turned on, and if the vehicle is stationary; and deactivating the servo parking brake automatically and independently of the action of the driver, by driving the third servo control when the servo clutch is disengaged for transmitting the torque generated by the internal-combustion engine to the driving wheels;

wherein the step of deactivating the servo parking brake comprises the further steps of:

storing a position of engagement of the servo clutch in which the servo clutch starts to transmit torque;

disengaging the servo clutch, by driving the second servo control;

detecting cyclically the position of the servo clutch; and deactivating the servo parking brake automatically and independently of the action of the driver, by driving the third servo control when the servo clutch is at the stored position of engagement.

* * * * *